(12) United States Patent
Goichman et al.

(10) Patent No.: US 12,461,299 B2
(45) Date of Patent: Nov. 4, 2025

(54) LED AND LASER DIODE COMBINED ILLUMINATION SYSTEM

(71) Applicant: Orbotech Ltd., Yavne (IL)

(72) Inventors: Tal Goichman, Kiryat Ono (IL); Ronen Yogev, Hulda (IL); Assaf Hacohen, Tel Aviv (IL); Ilia Lutsker, Kfar Saba (IL)

(73) Assignee: Orbotech Ltd., Yavne (IL)

( * ) Notice: Subject to any disclaimer, the term of this patent is extended or adjusted under 35 U.S.C. 154(b) by 0 days.

(21) Appl. No.: 18/399,095

(22) Filed: Dec. 28, 2023

(65) Prior Publication Data

US 2025/0147216 A1    May 8, 2025

Related U.S. Application Data

(60) Provisional application No. 63/546,934, filed on Nov. 2, 2023.

(51) Int. Cl.
  *F21V 8/00* (2006.01)
(52) U.S. Cl.
  CPC ......... *G02B 6/0008* (2013.01); *G02B 6/0006* (2013.01); *G02B 6/0073* (2013.01)
(58) Field of Classification Search
  CPC ... G02B 6/0008; G02B 6/0006; G02B 6/0073
  See application file for complete search history.

(56) References Cited

U.S. PATENT DOCUMENTS

| 8,218,140 B2 | 7/2012 | Trupke et al. |
| 9,395,055 B2 | 7/2016 | Brukilacchio et al. |
| 11,421,843 B2 | 8/2022 | Harrison et al. |
| 11,437,775 B2 | 9/2022 | Raring et al. |
| 11,586,101 B2 | 2/2023 | Pettitt et al. |
| 2004/0189787 A1 | 9/2004 | Hanina et al. |
| 2008/0192458 A1* | 8/2008 | Li ................ G02B 6/005 |
| | | 313/498 |
| 2012/0307512 A1 | 12/2012 | Cogger et al. |
| 2013/0010353 A1 | 1/2013 | Berman |
| 2013/0148113 A1 | 6/2013 | Oku et al. |

(Continued)

FOREIGN PATENT DOCUMENTS

| CN | 102621791 A | 8/2012 |
| CN | 113031292 A | 6/2021 |

(Continued)

OTHER PUBLICATIONS

WIPO, International Search Report issued for International Application No. PCT/IB2024/060504, Feb. 3, 2025.

*Primary Examiner* — Mary Ellen Bowman
(74) *Attorney, Agent, or Firm* — Hodgson Russ LLP (57) ABSTRACT

The combined illumination system includes a first waveguide and a second waveguide. An output end of the first waveguide is coupled to an input end of the second waveguide. An LED light source is configured to emit light from an input end of the first waveguide and through the output end of the second waveguide to illuminate a workpiece. A laser light source is coupled to an input end of an optical fiber, and an output end of the optical fiber is coupled to the input end of the second waveguide. The laser light source is configured to emit laser light from the input end of the optical fiber through the output end of the second waveguide to illuminate the workpiece.

20 Claims, 6 Drawing Sheets

(56) References Cited

U.S. PATENT DOCUMENTS

| | | | |
|---|---|---|---|
| 2016/0324408 A1 | 11/2016 | Ohara et al. | |
| 2020/0232611 A1* | 7/2020 | Raring | H01S 5/0233 |
| 2020/0232618 A1* | 7/2020 | Rudy | B60Q 3/62 |
| 2020/0397262 A1* | 12/2020 | Talbert | A61B 1/07 |

FOREIGN PATENT DOCUMENTS

| | | |
|---|---|---|
| CN | 218099912 U | 12/2022 |
| CN | 115343905 B | 1/2023 |
| EP | 2708808 A1 | 3/2014 |

* cited by examiner

LED AND LASER DIODE COMBINED ILLUMINATION SYSTEM

CROSS-REFERENCE TO RELATED APPLICATIONS

This application claims priority to the provisional patent application filed Nov. 2, 2023, and assigned U.S. App. No. 63/546,934, the disclosure of which is hereby incorporated by reference.

FIELD OF THE DISCLOSURE

This disclosure relates to an illumination system and, more particularly, to illumination for inspection and imaging of electronic devices.

BACKGROUND OF THE DISCLOSURE

Evolution of the electronics manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for an electronics manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etching, deposition, and ion implantation. An arrangement of multiple semiconductor devices fabricated on a single semiconductor wafer may be separated into individual semiconductor devices.

Inspection processes are used at various steps during electronics manufacturing to detect defects on wafers, electronic devices, or electrical circuits to promote higher yield in the manufacturing process and, thus, higher profits. Inspection has always been an important part of fabricating electronic devices such as integrated circuits (ICs) and printed circuit boards (PCBs), including assembled PCBs. However, as feature dimensions decrease, inspection becomes even more important to the successful manufacture of acceptable electronic devices because smaller defects can cause devices and assemblies to fail. For instance, as feature dimensions decrease, detection of defects of decreasing size has become necessary because even relatively small defects may cause unwanted aberrations in the devices.

During inspection or imaging processes, a workpiece can be illuminated by a light source such as a laser, LED, or gas discharge lamp. Some applications may rely on a broad-spectrum source, which limits the use of a narrowband laser as the light source. Furthermore, lasers can create a speckle pattern that can reduce illumination uniformity. While LEDs and gas discharge lamps can emit a broader spectrum of light, these light sources have reduced illumination intensity compared to lasers and have wide divergence angles that make it difficult to collect and focus the light. In addition, gas discharge lamps can be less suitable for digital systems and cannot be operated in a pulsed manner. Space limitations within the inspection system further limit the types of light sources that can be used to illuminate the workpiece.

Therefore, what is needed is an improved illumination system for inspection and imaging processes.

BRIEF SUMMARY OF THE DISCLOSURE

An embodiment of the present disclosure provides a system comprising a first waveguide and a second waveguide. An output end of the first waveguide may be coupled to an input end of the second waveguide. The system may further comprise an LED light source configured to emit light from an input end of the first waveguide and through the output end of the second waveguide to illuminate a workpiece. The system may further comprise an optical fiber and a laser light source coupled to an input end of the optical fiber. An output end of the optical fiber may be coupled to the input end of the second waveguide. The laser light source may be configured to emit laser light from the input end of the optical fiber through the output end of the second waveguide to illuminate the workpiece.

In some embodiments, the first waveguide may have a smaller cross-section than the second waveguide, which forms a ledge at the input end of the second waveguide, and the output end of the optical fiber is coupled to the input end of the second waveguide at the ledge.

In some embodiments, the LED light source may comprise an array of LEDs.

In some embodiments, the laser light source may comprise a plurality of laser light sources and the optical fiber may comprise a plurality of optical fibers. The plurality of laser light sources may be coupled to the plurality of optical fibers, and the plurality of optical fibers may be coupled to the input end of the second waveguide.

In some embodiments, the system may further comprise an optical diffuser disposed between the output end of the optical fiber and the input end of second waveguide.

In some embodiments, the input end of the second waveguide may include a diffusive surface at the interface with the output end of the optical fiber.

In some embodiments, the output end of the optical fiber may have a curved surface.

In some embodiments, the system may further comprise a ball lens disposed at the output end of the optical fiber.

In some embodiments, the LED light source may be configured to emit ultraviolet light, visible light, or near infrared light, and the laser light source is configured to emit ultraviolet laser light, visible laser light, or near infrared laser light.

In some embodiments, the LED light source and the laser light source may be configured to illuminate the workpiece simultaneously or in modulated succession.

In some embodiments, the output end of the second waveguide may have a larger cross-section than the input end of the second waveguide.

In some embodiments, the first waveguide and the second waveguide may be configured to homogenize the light passing from the input end of the first waveguide through the output end of the second waveguide.

Another embodiment of the present disclosure provides a method. The method may comprise emitting light from an LED light source from an input end of a first waveguide through an output end of a second waveguide. An output end of the first waveguide may be coupled to an input end of the second waveguide. The method may further comprise emitting laser light from a laser light source from an input end of an optical fiber through the output end of the second waveguide. An output end of the optical fiber may be coupled the input end of the second waveguide. The method may further comprise illuminating a workpiece with the light from the LED light source and the laser light from the laser light source.

In some embodiments, the LED light source may comprise an array of LEDs, and emitting light from the LED light source from the input end of the first waveguide through the output end of the second waveguide may comprise emitting light from the array of LEDs from the input end of the first waveguide through the output end of the second waveguide.

In some embodiments, the laser light source may comprise a plurality of laser light sources, and the optical fiber may comprise a plurality of optical fibers. The plurality of laser light sources may be coupled to the plurality of optical fibers, and the plurality of optical fibers may be coupled to the input end of the second waveguide. Emitting laser light from the laser light source from the input end of the optical fiber through the output end of the second waveguide may comprise emitting light from the plurality of laser light sources from the input ends of the plurality of optical fibers through the output end of the second waveguide.

In some embodiments, the method may further comprise diffusing the laser light passing from the output end of the optical fiber through the input end of the second waveguide.

In some embodiments, illuminating the workpiece with the light from the LED light source and the laser light from the laser light source may comprise illuminating the workpiece with the light from the LED light source and the laser light from the laser light source simultaneously or in modulated succession.

In some embodiments, the method may further comprise homogenizing the light passing from the input end of the first waveguide through the output end of the second waveguide; and homogenizing the laser light passing from the input end of the second waveguide through the output end of the second waveguide.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Figure 1:
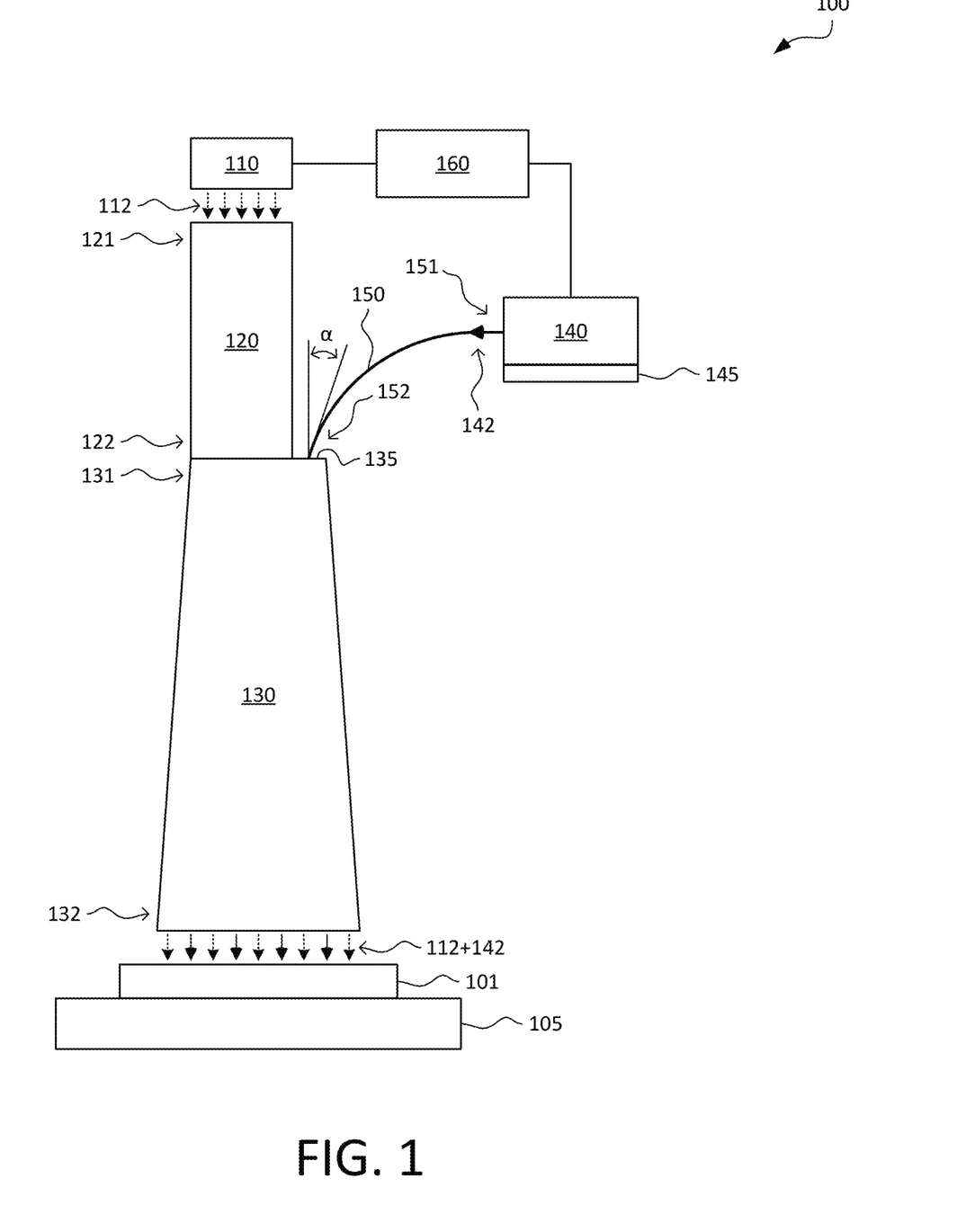
FIG. 1 is a diagram of a system according to an embodiment of the present disclosure.

An embodiment of the present disclosure provides a system 100, as shown in FIG. 1. The system 100 may be part of an inspection system or an imaging system configured to inspect or capture images of a workpiece 101. The workpiece 101 may be a semiconductor wafer, substrate, IC, PCB, or display panel, and is not limited herein. The workpiece 101 may be disposed on a stage 105. The stage 105 may be movable (e.g., in X, Y, and/or Z directions) to inspect or capture images of different parts of the workpiece 101.

Figure 2:
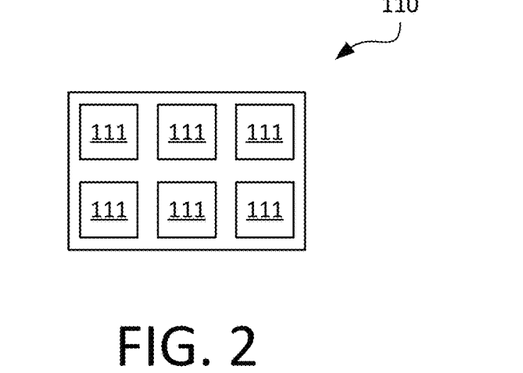
FIG. 2 is a bottom view of a light source according to an embodiment of the present disclosure.

The system 100 may further comprise an LED light source 110. The LED light source 110 may comprise a single LED or an array of LEDs 111 configured to emit light 112. For example, the LED light source 110 may comprise 6 LEDs 111 (as shown in FIG. 2), 8 LEDs, 10 LEDs, or any number of LEDs arranged in a rectangular array. In some embodiments, the light 112 emitted by the LED light source 110 may be ultraviolet light, visible light, or near infrared light. For example, the light 112 emitted by the LED light source 110 may have a broadband wavelength of 300 to 2000 nm.

The system 100 may further comprise a first waveguide 120. The LED light source 110 may be configured to emit light 112 through an input end 121 of the first waveguide 120. In an instance, the LED light source 110 may be coupled to the input end 121 of the first waveguide 120. Alternatively, the LED light source 110 may be separated from the input end 121 of the first waveguide 120 by 1 mm or less. The first waveguide 120 may be a tube or a solid structure made of glass or plastic having a substantially rectangular or cylindrical shape. The first waveguide 120 may be configured to homogenize the light 112 from the LED light source 110 passing from the input end 121 of the first waveguide 120 to an output end 122 of the first waveguide 120. For example, divergent light 112 from the LED light source 110 may go through one or more internal reflections in the first waveguide 120 to produce a uniform beam profile of the light 112.

The system 100 may further comprise a second waveguide 130. The output end 122 of the first waveguide 120 may be coupled to an input end 131 of the second waveguide. For example, the first waveguide 120 and the second waveguide 130 may be coupled together with an adhesive or using other joining methods. The adhesive may be an optical grade adhesive having a refractive index similar to that of the first waveguide 120 and the second waveguide 130. Alternatively, the first waveguide 120 and the second waveguide 130 may be integrally formed. The second waveguide 130 may be a tube or a solid structure made of glass or plastic having a substantially rectangular or cylindrical shape. The second waveguide 130 may be configured to homogenize the light 112 from the LED light source 110 passing from the input end 131 of the second waveguide 130 to an output end 132 of the second waveguide 130. For example, the light 112 may go through one or more internal reflections in the second waveguide 130 to produce a uniform beam profile of the light 112. The second waveguide 130 may be longer than the first waveguide 120. The second waveguide 130 may be long relative to its cross-section, to allow for multiple internal reflections of the light 112 as it passes from the input end 131 to the output end 132. The second waveguide 130 may be diverging (to increase the area illuminated by the light 112) or converging (to enhance the power density in a smaller area illuminated by the light 112). The second waveguide 130 may be configured to direct the light 112 from the LED light source 110 to illuminate the workpiece 101.

The system 100 may further comprise a laser light source 140. The laser light source 140 may comprise a laser diode configured to emit laser light 142. In some embodiments, the laser light 142 emitted by the laser light source 140 may be ultraviolet laser light, visible laser light, or near infrared laser light. For example, the laser light 142 emitted by the laser light source 140 may have a wavelength of 300 to 2000 nm. The laser light source 140 may be configured to emit laser light 142 in continuous or pulsed modes. It should be understood that the laser light source 140 may be more powerful than the LED light source 110 and may generate heat. To regulate the heat, the laser light source 140 may be disposed on a cold plate 145 or other cooling system.

The system 100 may further comprise an optical fiber 150. The laser light source 140 may be coupled to an input end 151 of the optical fiber 150. An output end 152 of the optical fiber 150 may be coupled to the input end 131 of the second waveguide 130. The optical fiber 150 may have a cladding diameter of 125 to 1100 µm. The optical fiber 150 may be configured to guide the laser light 142 from the laser light source 140 from the input end 151 of the optical fiber 150 through the second waveguide 130. The second waveguide 130 may be further configured to homogenize the laser light 142 from the laser light source 140 passing from the input end 131 of the second waveguide 130 to the output end 132 of the second waveguide 130. For example, the laser light 142 may go through one or more internal reflections in the second waveguide 130 to produce a uniform beam profile of the laser light 142. The second waveguide 130 may be further configured to direct the laser light 142 from the laser light source 140 to illuminate the workpiece 101. The optical fiber 150 may allow the laser light source 140 to be distanced from the second waveguide 130 and other elements of the optical column. Accordingly, any heat generated by the laser light source 140 may have less effect on the optics, which could reduce inspection and image quality. In addition, the laser light source 140 may be located at a distance away from the space limitations of the optical column, which can allow space for the cold plate 145 or other cooling system to control heat.

Figure 3:
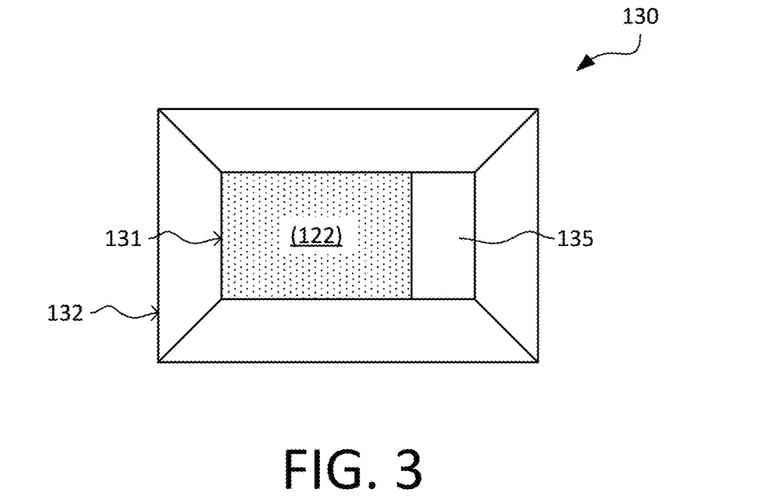
FIG. 3 is a top view of a second waveguide according to an embodiment of the present disclosure.

In some embodiments, the first waveguide 120 may have a smaller cross-section than the second waveguide 130. Accordingly, the output end 122 of the first waveguide 120 coupled to the input end 131 of the second waveguide 130 may form a ledge 135, as shown in FIG. 3. The shape of the ledge 135 may depend on the shape of the output end 122 of the first waveguide 120 and the shape of the input end 131 of the second waveguide 130. For example, the ledge 135 may have a rectangular shape (based on the first waveguide 120 and the second waveguide 130 having rectangular shapes), a crescent shape (based on the first waveguide 120 and the second waveguide 130 having rounded shapes), or other shapes. In an instance, the ledge 135 may have a width of 150 to 2000 µm. The output end 152 of the optical fiber 150 may be coupled to the input end 131 of the second waveguide 130 at the ledge 135.

The optical fiber 150 may be coupled to the input end 131 of the second waveguide 130 (e.g., at the ledge 135) at an angle α. In an instance, the angle α may be 0 to 45°. The length of the first waveguide 120 may be large enough for the optical fiber 150 to bend away from the optical column at a height that is lower than the LED light source 110, so as not to interfere with the LED light source 110. The length of the first waveguide 120 may depend on the angle α and the bending radius of the optical fiber 150 (e.g., a smaller angle α may require the length of the first waveguide 120 to be longer to complete the bend compared to a larger angle α).

Figure 4:
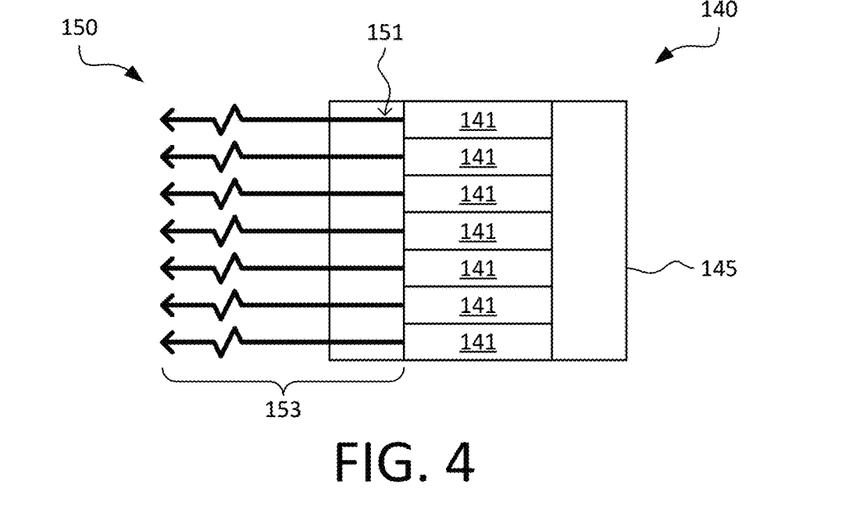
FIG. 4 is a top view of a laser light source according to an embodiment of the present disclosure.

In some embodiments, the laser light source 140 may comprise a plurality of laser light sources 141, and the optical fiber 150 may comprise a plurality of optical fibers 153, as shown in FIG. 4. For example, the plurality of laser light sources 141 may comprise 20 or more laser light sources 140 in a linear arrangement or stacked in a rectangular array. The plurality of laser light sources 141 may operate at the same wavelength or at different wavelengths. Different wavelengths may improve the versatility of the system 100, as it can be used for different processes with different workpieces that respond to different wavelengths. The plurality of laser light sources 141 may be disposed on the same cold plate 145 or other cooling system. The plurality of laser light sources 141 may be coupled to the input ends 151 of the plurality of optical fibers 153. The plurality of optical fibers 153 may combine into a fiber bundle that is coupled to the input end 131 of the second waveguide 130. The fiber bundle may be arranged in a shape corresponding the shape of the input end 131 of the second waveguide 130 that is not covered by the output end 122 of the first waveguide 120 (e.g., the shape of the ledge 135).

The system 100 may further comprise a processor 160. The processor 160 may include a microprocessor, a microcontroller, or other devices.

The processor 160 may be coupled to the components of the system 100 in any suitable manner (e.g., via one or more transmission media, which may include wired and/or wireless transmission media) such that the processor 160 can receive output. The processor 160 may be configured to perform a number of functions using the output. An inspection tool can receive instructions or other information from the processor 160. The processor 160 optionally may be in electronic communication with another inspection tool, a metrology tool, a repair tool, or a review tool (not illustrated) to receive additional information or send instructions.

The processor 160 may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 160 may be disposed in or otherwise part of the system 100 or another device. In an example, the processor 160 and may be part of a standalone control unit or in a centralized quality control unit. Multiple processors 160 may be used, defining multiple subsystems of the system 100.

The processor 160 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 160 to implement various methods and functions may be stored in readable storage media, such as a memory.

If the system 100 includes more than one subsystem, then the different processors 160 may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 160 may be configured to perform a number of functions using the output of the system 100 or other output. For instance, the processor 160 may be configured to send the output to an electronic data storage unit or another storage medium. The processor 160 may be further configured as described herein.

The processor 160 may be configured according to any of the embodiments described herein. The processor 160 also may be configured to perform other functions or additional steps using the output of the system 100 or using images or data from other sources.

The processor 160 may be communicatively coupled to any of the various components or sub-systems of system 100 in any manner known in the art. Moreover, the processor 160 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the processor 160 and other subsystems of the system 100 or systems external to system 100. Various steps, functions, and/or operations of system 100 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random-access memory, a magnetic or optical disk, a non-volatile memory, a solid-state memory, a magnetic tape, and the like. A carrier medium may include a transmission medium such as a wire, cable, or wireless transmission link. For instance, the various steps described throughout the present disclosure may be carried out by a single processor 160 (or computer subsystem) or, alternatively, multiple processors 160 (or multiple computer subsystems). Moreover, different sub-systems of the system 100 may include one or more computing or logic systems. Therefore, the above description should not be interpreted as a limitation on the present disclosure but merely an illustration.

The processor 160 may be in electronic communication with the LED light source 110 and the laser light source 140.

The processor 160 may be configured to send instructions to the LED light source 110 to emit light 112. Accordingly, the processor 160 may be configured to control the LED light source 110 and to illuminate the workpiece 101 with light 112. The processor 160 may be further configured to send instructions to the laser light source 140 to emit laser light 142. Accordingly, the processor 160 may be configured to control the laser light source 140 and to illuminate the workpiece 101 with laser light 142. Furthermore, the processor 160 may be configured to control the LED light source 110 and the laser light source 140 to simultaneously illuminate the workpiece 101 with light 112 and laser light 142. Accordingly, the illumination power may be significantly increased compared to pure LED illumination, while also maintaining a broad spectrum. In an instance, the workpiece 101 may be illuminated by one of the light 112 or the laser light 142 first, and then illuminated by the other of the light 112 or the laser light 142. Accordingly, the modulated illumination of the light 112 and the laser light 142 may highlight different features in subsequent imaging frames.

In some embodiments, the output end 132 of the second waveguide 130 may have a larger cross-section than the input end 131 of the second waveguide 130. In other words, the second waveguide 130 may have a tapered profile from the input end 131 to the output end 132. The tapered profile of the second waveguide 130 can increase the illumination area on the workpiece 101 while reducing the divergence angles of the light 112 and the laser light 142.

Figure 5:
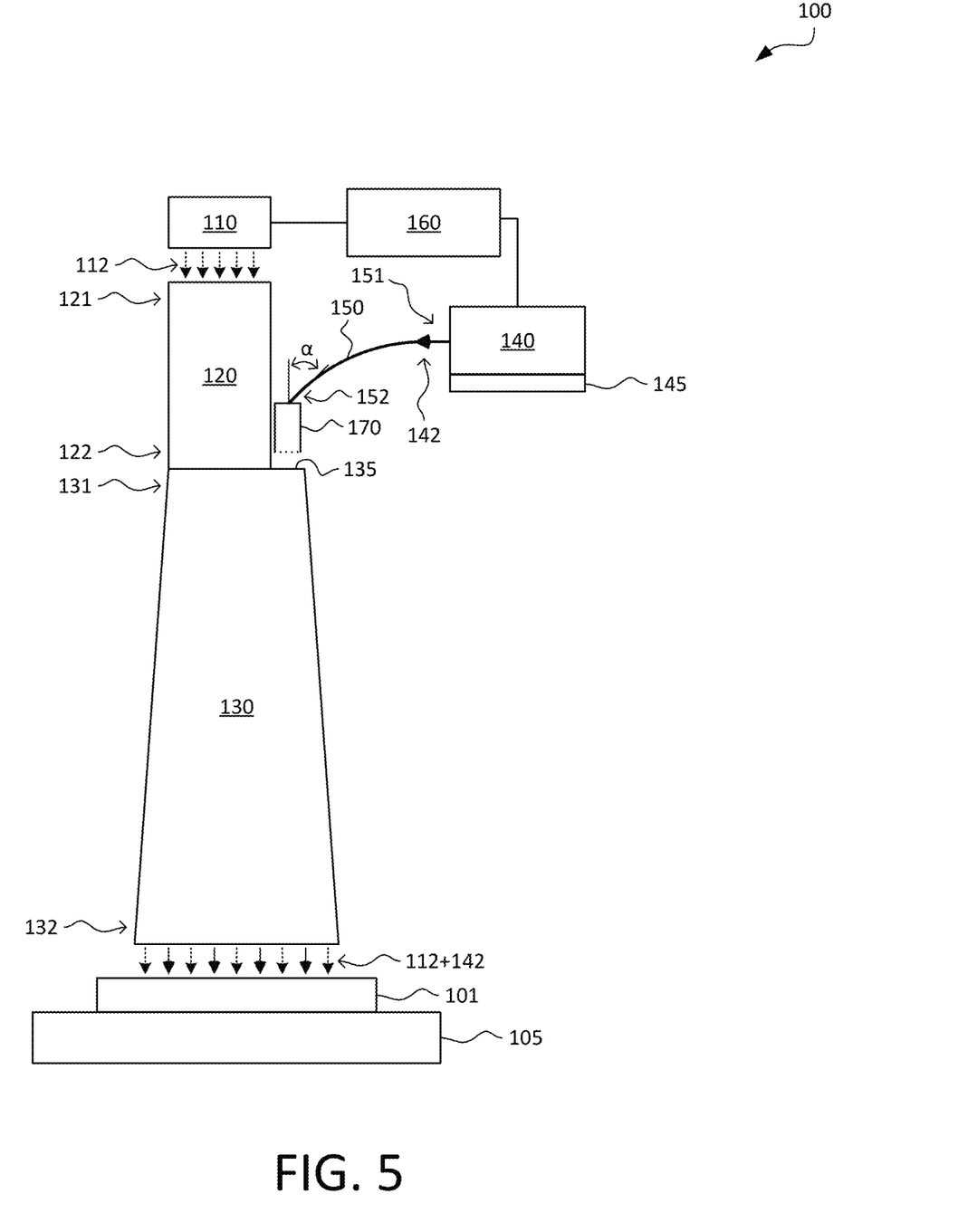
FIG. 5 is a diagram of a system according to another embodiment of the present disclosure.

In some embodiments, the system 100 may further comprise an optical diffuser 170, as shown in FIG. 5. The optical diffuser 170 may be composed of an optically clear material, with one or more of its surfaces processed to increase the divergence and scatter the laser light 142. The surface may be randomly refractive by means of roughening the surface (e.g., by grinding or sand blasting the optical surface). Alternatively, the scattering may be caused by an orderly refractive surface (e.g., a single lens or microlens array). The optical diffuser 170 may be diffractively scattering, with ordered features designed to create a desired diffraction pattern in the incoming laser light 142. The optical diffuser 170 may also be volumetrically scattering, where the bulk of the optical material itself acts to refract or diffract light. The optical diffuser 170 may be disposed between the output end 152 of the optical fiber 150 and the input end 131 of the second waveguide 130. In some embodiments, a single optical diffuser 170 may receive laser light 142 from the plurality of optical fibers 153. The optical diffuser 170 may be configured to increase the divergence angles of the laser light 142 passing from the output end 152 of the optical fiber 150 to the input end 131 of the second waveguide 130. Accordingly, the optical diffuser 170 may allow the angle α to be greater, which can reduce the space required to bend the optical fiber 150, thereby reducing the length of the first waveguide 120.

Figure 6:
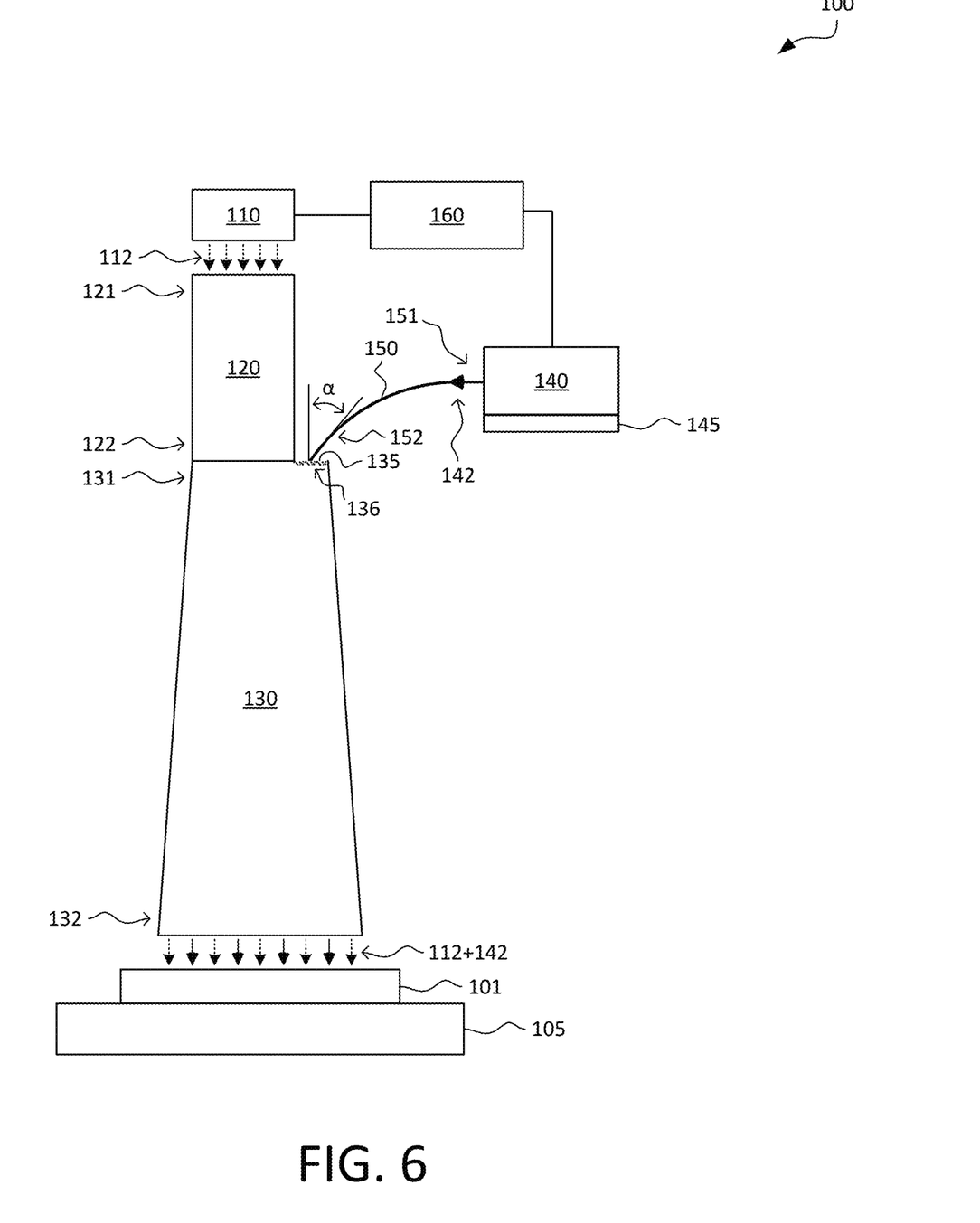
FIG. 6 is a diagram of a system according to another embodiment of the present disclosure.

In some embodiments, the input end 131 of the second waveguide 130 may include a diffusive surface 136 at the interface with the output end 152 of the optical fiber 150, as shown in FIG. 6. The diffusive surface 136 may be randomly refractive, by means of roughening the surface (e.g., by grinding or sand blasting the optical surface). Alternatively, the diffusive surface 136 may be diffractively scattering, with ordered features designed to create a desired diffraction pattern in the incoming laser light 142. For example, the diffusive surface 136 may cover the entire input end 131 of the second waveguide 130. Alternatively, the diffusive surface 136 may cover the ledge 135 of the second waveguide 130. The diffusive surface 136 may be configured to increase the divergence angles of the laser light 142 passing from the output end 152 of the optical fiber 150 to the input end 131 of the second waveguide 130. Accordingly, the diffusive surface 136 may allow the angle α to be greater, which can reduce the space required to bend the optical fiber 150, thereby reducing the length of the first waveguide 120, without the space of the optical diffuser 170.

Figure 7A:
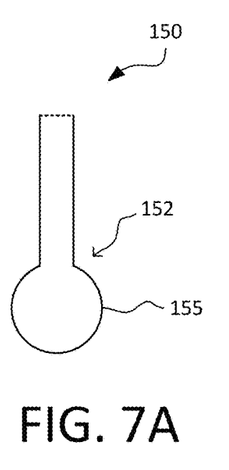
FIG. 7A is a detail view of the output end of an optical fiber according to an embodiment of the present disclosure having a spherical shape.
Figure 7B:
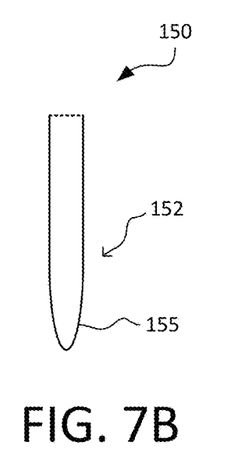
FIG. 7B is a detail view of the output end of an optical fiber according to another embodiment of the present disclosure having a rounded shape.
Figure 7C:
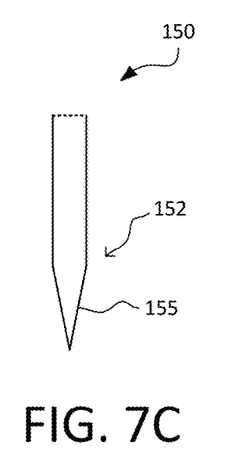
FIG. 7C is a detail view of the output end of an optical fiber according to another embodiment of the present disclosure having a conical shape.

In some embodiments, the output end 152 of the optical fiber 150 may have a curved surface 155, as shown in FIGS. 7A-7C. For example, the curved surface 155 may be spherical (as shown in FIG. 7A), rounded (as shown in FIG. 7B), conical (as shown in FIG. 7C), or other shapes. The curved surface 155 may increase the divergence angles of the laser light 142 from the laser light source 140 as it exits the fiber. The curved surface 155 of the optical fiber 150 may be achieved by thermal means (e.g., by heating the output end 152 of the optical fiber 150 to a moldable state, deforming into the curved shape, and cooling), chemical processing (e.g., by etching into the curved shape), or mechanical processing (e.g., cutting into the curved shape). In some embodiments, each of the plurality of optical fibers 153 may have a curved surface 155 at their output end 152. The curved surface 155 may be configured to increase the divergence angles of the laser light 142 passing from the output end 152 of the optical fiber 150 to the input end 131 of the second waveguide 130. Accordingly, the curved surface 155 may allow the angle α to be greater, which can reduce the space required to bend the optical fiber 150, thereby reducing the length of the first waveguide 120, without the space of the optical diffuser 170.

Figure 8:
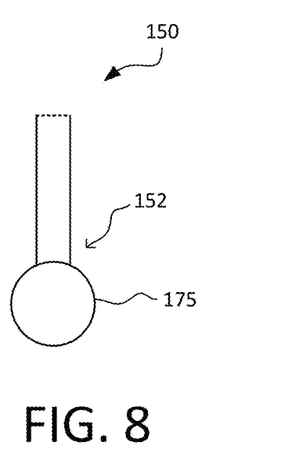
FIG. 8 is a detail view of the output end of an optical fiber according to another embodiment of the present disclosure having a ball lens.

In some embodiments, the system 100 may further comprise a ball lens 175 disposed at the output end 152 of the optical fiber 150, as shown in FIG. 8. The ball lens 175 may act to increase the divergence angles of the laser light 142 from the laser light source 150, before entering the input end 131 of the second waveguide 130. In some embodiments, each of the plurality of optical fibers 150 may have a ball lens 175 disposed at the output end 152. The ball lens 175 may be configured to increase the divergence angles of the laser light 142 passing from the output end 152 of the optical fiber 150 to the input end 131 of the second waveguide 130. Accordingly, the ball lens 175 may allow the angle α to be greater, which can reduce the space required to bend the optical fiber 150, thereby reducing the length of the first waveguide 120, in a space smaller than that of the optical diffuser 170.

With the system 100, the LED light source 110 and the laser light source 140 are incorporated together to illuminate the workpiece 101 with both light 112 and laser light 142, which can allow for greater design flexibility power density, and illumination uniformity. Since the laser light source 140 is coupled to the optical fiber 150, the laser light source 140 can be located distally from the other components of the system 100, which can avoid space limitations near the optical column and may allow for more space for cooling systems for the laser light source 140, thereby enabling higher power illumination.

Figure 9:
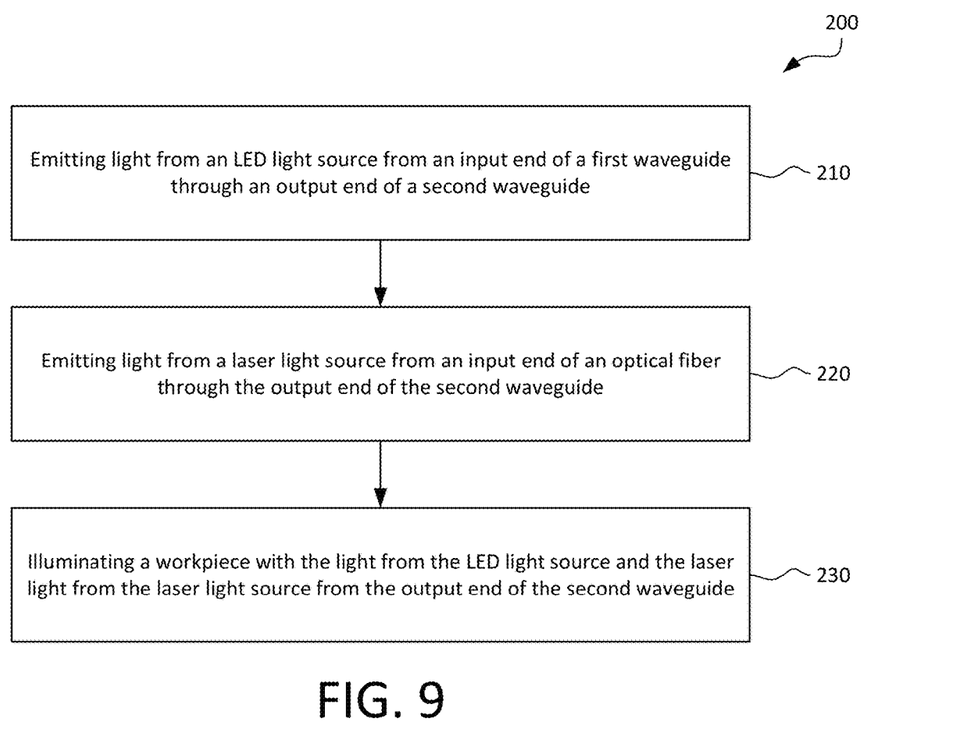
FIG. 9 is a flowchart of a method according to an embodiment of the present disclosure.

Another embodiment of the present disclosure provides a method 200. The method 200 may comprise the following steps, as shown in FIG. 9.

At step 210, light is emitted from an LED light source from an input end of a first waveguide through an output end of a second waveguide. In some embodiments, the light emitted by the LED light source may be ultraviolet light, visible light, or near infrared light. For example, the light emitted by the LED light source may have a broadband wavelength of 300 to 2000 nm. An output end of the first waveguide may be coupled to an input end of the second waveguide. The first waveguide and the second waveguide may be a tube or a solid structure made of glass or plastic having a substantially rectangular or cylindrical shape.

In some embodiments, the LED light source may comprise an array of LEDs. For example, the LED light source may comprise 6 LEDs, 8 LEDs, 10 LEDs, or any number of LEDs arranged in a rectangular array. Step 210 may comprise emitting light from the array of LEDs from the input end of the first waveguide through the output end of the second waveguide.

At step 220, laser light is emitted from a laser light source from an input end of an optical fiber through the output end of the second waveguide. The laser light source may comprise a laser diode configured to emit laser light. In some embodiments, the laser light emitted by the laser light source may be ultraviolet laser light, visible laser light, or near infrared laser light. For example, the laser light emitted by the laser light source may have a wavelength of 300 to 2000 nm. The laser light source may be configured to emit laser light in continuous or pulsed modes. An output end of the optical fiber may be coupled to the input end of the second waveguide. The optical fiber may have a cladding diameter of 125 to 1100 μm. The optical fiber may be configured to guide the laser light from the laser light source from the input end of the optical fiber through the second waveguide. The optical fiber may allow the laser light source to be distanced from the second waveguide and other elements of the optical column.

In some embodiments, the laser light source may comprise a plurality of laser light sources, and the optical fiber may comprise a plurality of optical fibers. The plurality of laser light sources may be coupled to the plurality of optical fibers. Step 220 may comprise emitting light from the plurality of laser light sources from the input ends of the plurality of optical fibers through the output end of the second waveguide. The plurality of laser light sources may operate at the same wavelength or different wavelengths. Different wavelengths may improve the versatility of the method 200, as it can be used for different processes with different workpieces that respond to different wavelengths.

At step 230, a workpiece is illuminated with the light from the LED light source and the laser light from the laser light source from the output end of the second waveguide. The workpiece may be a semiconductor wafer, substrate, IC, PCB, or display panel, and is not limited herein. It should be understood that steps 210 and 220 may be performed in the order shown in FIG. 7 or in reverse order. Alternatively, steps 210 and 220 maybe performed simultaneously.

In some embodiments, step 230 may comprise illuminating the workpiece with the light from the LED light source and the laser light from the laser light source simultaneously or in modulated succession. Accordingly, the illumination power may be significantly increased compared to pure LED illumination, while also maintaining a broad spectrum. Alternatively, the workpiece may be illuminated by one of the light or the laser light first, and then illuminated by the other of the light or the laser light. Accordingly, modulated illumination of the light and the laser light may highlight different features in subsequent imaging frames.

Figure 10:
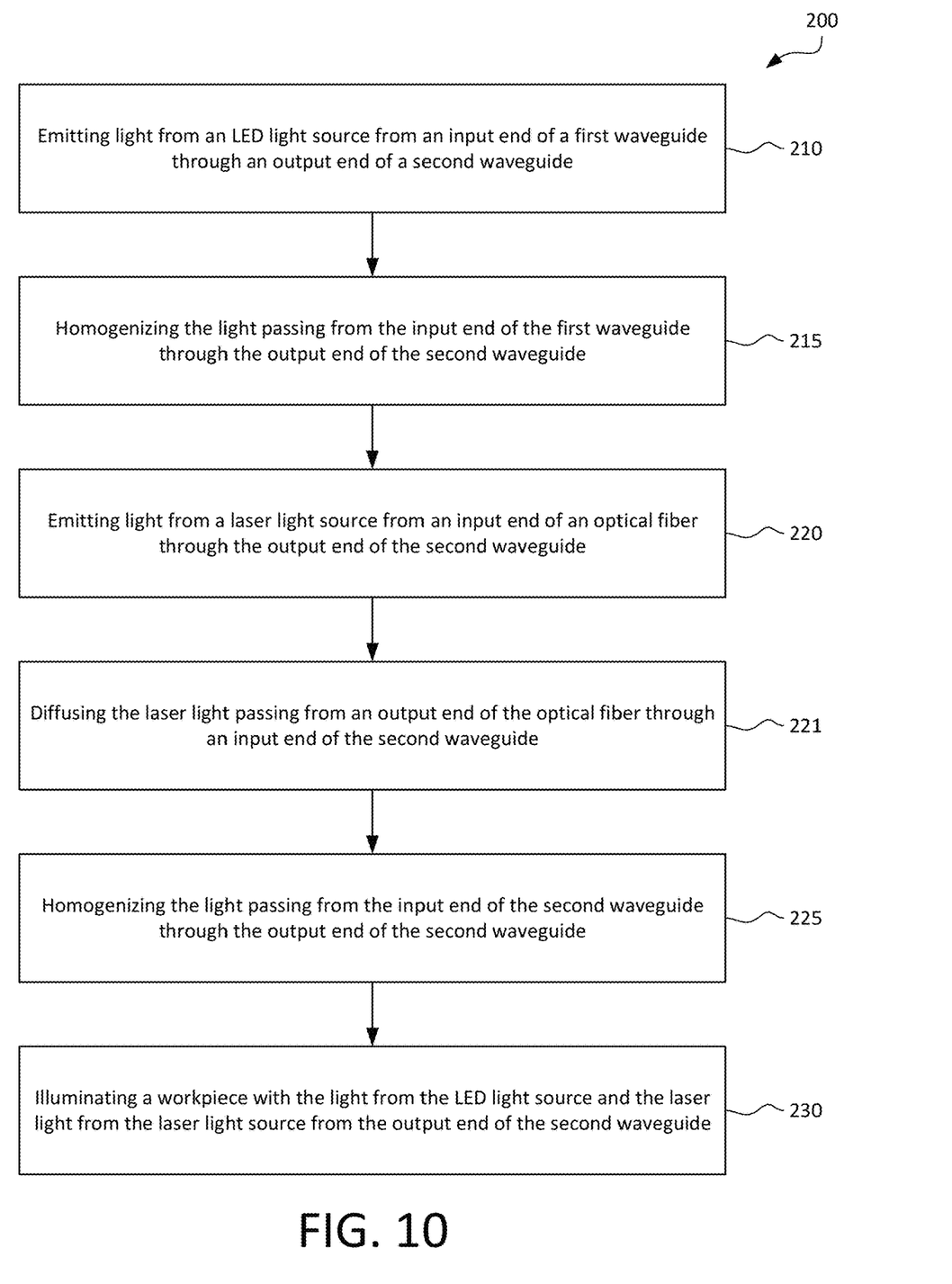
FIG. 10 is a flowchart of a method according to another embodiment of the present disclosure.

In some embodiments, the method 200 may further comprise the following steps shown in FIG. 10.

At step 215, the light passing from the input end of the first waveguide through the output end of the second waveguide is homogenized. The first waveguide may be configured to homogenize the light from the LED light source passing from the input end of the first waveguide to an output end of the first waveguide. For example, divergent light from the LED light source may go through multiple internal reflections in the first waveguide 120 to produce a uniform beam profile of the light. The length of the first waveguide and the second waveguide may allow for multiple internal reflections to homogenize the light.

At step 225, the laser light passing from the input end of the second waveguide through the output end of the second waveguide is homogenized. The second waveguide may be configured to homogenize the light from the LED light source passing from the input end of the second waveguide to an output end of the second waveguide 130. For example, the laser light may go through multiple internal reflections in the second waveguide to produce a uniform beam profile of the laser light. The length of the second waveguide may allow for multiple internal reflections to homogenize the laser light. It should be understood that steps 210 and 215 may be performed before steps 220 and 225 (as shown in FIG. 8) or after steps 220 and 225. If steps 210 and 220 are performed simultaneously, steps 215 and 225 may also be performed simultaneously.

In some embodiments, the method 200 may further comprise step 221. At step 221, the laser light passing from the output end of the optical fiber through the input end of the second waveguide is diffused. In an instance, an optical diffuser may be disposed between the output end of the optical fiber and the input end of the second waveguide. In another instance, the input end of the second waveguide may include a diffusive surface at the interface with the output end of the optical fiber. In another instance, the output end of the optical fiber may be curved to diffuse the laser light. In another instance, a ball lens may be disposed at the output end of the optical fiber to diffuse the laser light. Diffusing the light can increase the divergence angles of the laser light passing from the output end of the optical fiber to the input end of the second waveguide. Accordingly, the angle α to be greater, which can reduce the space required to bend the optical fiber 150, thereby reducing the length of the first waveguide 120.

With the method 200, the LED light source and the laser light source are incorporated together to illuminate the workpiece, which can allow for greater design flexibility power density, and illumination uniformity. Since the laser light source is coupled to the optical fiber, the laser light source can be located distally from the other components of the system, which can avoid space limitations near the optical column and may allow for more space for cooling systems for the laser light source, thereby enabling higher power illumination.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
   a first waveguide;
   a second waveguide, wherein an output end of the first waveguide is coupled to an input end of the second waveguide;
   an LED light source configured to emit light from an input end of the first waveguide and through the output end of the second waveguide to illuminate a workpiece;
   an optical fiber, wherein an output end of the optical fiber is coupled to the input end of the second waveguide; and
   a laser light source coupled to an input end of the optical fiber, wherein the laser light source is configured to emit laser light from the input end of the optical fiber through the output end of the second waveguide to illuminate the workpiece.

2. The system of claim 1, wherein the first waveguide has a smaller cross-section than the second waveguide, which forms a ledge at the input end of the second waveguide, and the output end of the optical fiber is coupled to the input end of the second waveguide at the ledge.

3. The system of claim 1, wherein the LED light source comprises an array of LEDs.

4. The system of claim 1, wherein the laser light source comprises a plurality of laser light sources, the optical fiber comprises a plurality of optical fibers, the plurality of laser light sources are coupled to the plurality of optical fibers, and the plurality of optical fibers are coupled to the input end of the second waveguide.

5. The system of claim 1, further comprising:
   an optical diffuser disposed between the output end of the optical fiber and the input end of second waveguide.

6. The system of claim 1, wherein the input end of the second waveguide includes a diffusive surface at the interface with the output end of the optical fiber.

7. The system of claim 1, wherein the output end of the optical fiber has a curved surface.

8. The system of claim 1, further comprising:
   a ball lens disposed at the output end of the optical fiber.

9. The system of claim 1, wherein the LED light source is configured to emit ultraviolet light, visible light, or near infrared light, and the laser light source is configured to emit ultraviolet laser light, visible laser light, or near infrared laser light.

10. The system of claim 1, wherein the LED light source and the laser light source are configured to illuminate the workpiece simultaneously or in modulated succession.

11. The system of claim 1, wherein the output end of the second waveguide has a larger cross-section than the input end of the second waveguide.

12. The system of claim 1, wherein the first waveguide and the second waveguide are configured to homogenize the light passing from the input end of the first waveguide through the output end of the second waveguide.

13. A method comprising:
   emitting light from an LED light source from an input end of a first waveguide through an output end of a second waveguide, wherein an output end of the first waveguide is coupled to an input end of the second waveguide;
   emitting laser light from a laser light source from an input end of an optical fiber through the output end of the second waveguide, wherein an output end of the optical fiber is coupled the input end of the second waveguide; and
   illuminating a workpiece with the light from the LED light source and the laser light from the laser light source.

14. The method of claim 13, wherein the first waveguide has a smaller cross-section than the second waveguide, which forms a ledge at the input end of the second waveguide, and the output end of the optical fiber is coupled to the input end of the second waveguide at the ledge.

15. The method of claim 13, wherein the LED light source comprises an array of LEDs, and emitting light from the LED light source from the input end of the first waveguide through the output end of the second waveguide comprises:
emitting light from the array of LEDs from the input end of the first waveguide through the output end of the second waveguide.

16. The method of claim 13, wherein the laser light source comprises a plurality of laser light sources, the optical fiber comprises a plurality of optical fibers, the plurality of laser light sources are coupled to the plurality of optical fibers, the plurality of optical fibers are coupled to the input end of the second waveguide, and emitting laser light from the laser light source from the input end of the optical fiber through the output end of the second waveguide comprises:
emitting light from the plurality of laser light sources from the input ends of the plurality of optical fibers through the output end of the second waveguide.

17. The method of claim 13, further comprising:
diffusing the laser light passing from the output end of the optical fiber through the input end of the second waveguide.

18. The method of claim 13, wherein the light emitted by the LED light source is ultraviolet light, visible light, or near infrared light, and the laser light emitted by the laser light source is ultraviolet laser light, visible laser light, or near infrared laser light.

19. The method of claim 13, wherein illuminating the workpiece with the light from the LED light source and the laser light from the laser light source comprises:
illuminating the workpiece with the light from the LED light source and the laser light from the laser light source simultaneously or in modulated succession.

20. The method of claim 13, further comprising:
homogenizing the light passing from the input end of the first waveguide through the output end of the second waveguide; and
homogenizing the laser light passing from the input end of the second waveguide through the output end of the second waveguide.

\* \* \* \* \*